United States Patent
Howard et al.

(10) Patent No.: US 12,316,192 B2
(45) Date of Patent: May 27, 2025

(54) CONNECTION ADAPTER FOR MULTIPLE PCBs IN ACTUATOR

(71) Applicant: STONERIDGE CONTROL DEVICES, INC., Novi, MI (US)

(72) Inventors: Michael Howard, Brooklyn, MI (US); Steffen Ehrich, Livonia, MI (US)

(73) Assignee: STONERIDGE CONTROL DEVICES, INC., Novi, MI (US)

( * ) Notice: Subject to any disclaimer, the term of this patent is extended or adjusted under 35 U.S.C. 154(b) by 226 days.

(21) Appl. No.: 17/987,171

(22) Filed: Nov. 15, 2022

(65) Prior Publication Data
US 2024/0162778 A1 May 16, 2024

(51) Int. Cl.
| | |
|---|---|
| H02K 5/22 | (2006.01) |
| H02K 11/00 | (2016.01) |
| H02K 11/33 | (2016.01) |

(52) U.S. Cl.
CPC ............. *H02K 5/225* (2013.01); *H02K 11/33* (2016.01)

(58) Field of Classification Search
CPC .......... H02K 5/225; H02K 11/33; H02K 5/04; H02K 2211/03
See application file for complete search history.

(56) References Cited

U.S. PATENT DOCUMENTS

| | | | |
|---|---|---|---|
| 6,176,743 B1 | 1/2001 | Kuo | |
| 8,256,313 B2 | 9/2012 | Ganter | |
| 9,562,534 B2 | 2/2017 | Rosinski et al. | |
| 10,731,715 B2 | 8/2020 | Heravi et al. | |
| 10,806,032 B2 | 10/2020 | Ziemak et al. | |
| 11,114,806 B2 | 9/2021 | Zushi et al. | |
| 11,274,718 B2 | 3/2022 | Northrup et al. | |
| 2009/0215309 A1 | 8/2009 | Mongold et al. | |
| 2014/0017913 A1* | 1/2014 | Colwell | H01R 11/01 29/842 |

FOREIGN PATENT DOCUMENTS

| | | | | |
|---|---|---|---|---|
| JP | 2008141912 A | * | 6/2008 | ........... H02K 11/215 |
| WO | 2019099829 A1 | | 5/2019 | |
| WO | 2022028686 A1 | | 2/2022 | |

OTHER PUBLICATIONS

International Search Report and Written Opinion for International Application No. PCT/US2022/049897 mailed Jul. 11, 2023.

* cited by examiner

*Primary Examiner* — Thomas Truong
(74) *Attorney, Agent, or Firm* — Carlson, Gaskey & Olds, P.C.

(57) ABSTRACT

An actuator includes a housing, a motor that is mounted to the housing and operatively coupled to an output shaft, a first PCB that is arranged in the housing near the motor and includes a motor circuit, a second PCB that is arranged in the housing and spaced at a gap from the first PCB, and an electrical adapter that is arranged in the gap and operatively electrically connects the first and second PCBs. The adapter includes first and second ends opposite one another, and electrical elements extend between the first and second ends to first and second terminals that are respectively provided at the first and second ends. The electrical elements are arranged in a rigid enclosure that is configured to maintain the first and second terminals in fixed relationship to one another during assembly of the actuator.

20 Claims, 4 Drawing Sheets

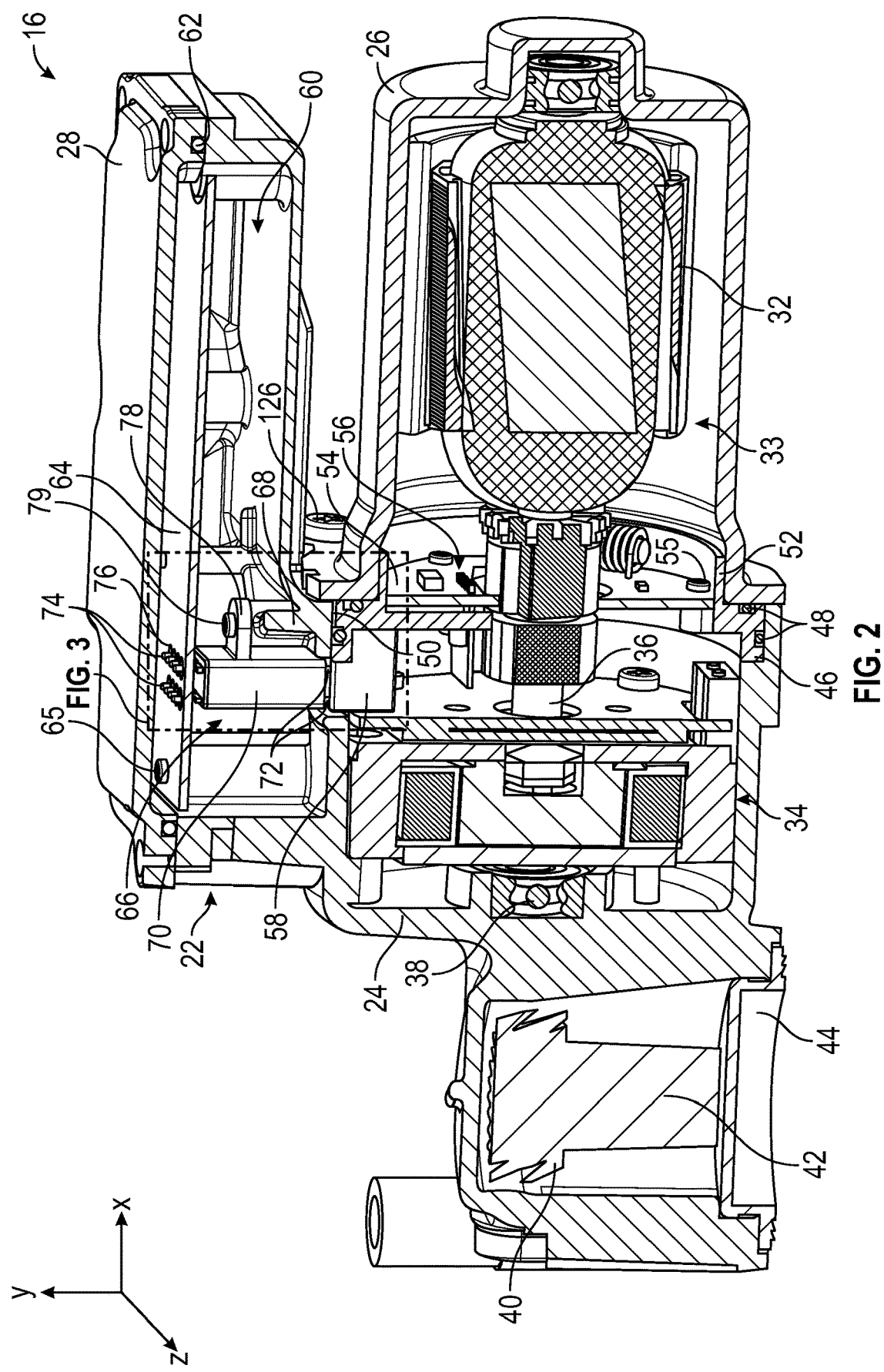

CONNECTION ADAPTER FOR MULTIPLE PCBs IN ACTUATOR

TECHNICAL FIELD

The disclosure relates to an actuator for use in a vehicle driveline, for example, a park lock actuator for use in locking a transmission and/or differential to prevent the vehicle from moving when parked. The disclosure also relates to an electrical adapter for electrically connecting multiple printed circuit boards (PCBs) within the actuator.

BACKGROUND

Actuators are used in countless applications, such as vehicle drivelines. One typical actuator uses an electric motor that drives an output shaft via a gear train. As the functionality of drivelines increase, the demands on actuators have also increased. This has led to enhanced control and diagnostics for the actuators.

Due to typically tight packaging constraints, the envelope of the actuator must remain relatively small. Thus, there may not be space for a single, relatively large controller within the actuator, requiring multiple controllers or PCBs within a common actuator housing but remotely from one another. The multiple PCBs are commonly electrically interconnected to one another by a small wiring harness, such as a ribbon cable.

SUMMARY

In one exemplary embodiment, an actuator includes a housing, a motor that is mounted to the housing and operatively coupled to an output shaft, a first PCB that is arranged in the housing near the motor and includes a motor circuit, a second PCB that is arranged in the housing and spaced at a gap from the first PCB, and an electrical adapter that is arranged in the gap and operatively electrically connects the first and second PCBs. The adapter includes first and second ends opposite one another, and electrical elements extend between the first and second ends to first and second terminals that are respectively provided at the first and second ends. The electrical elements are arranged in a rigid enclosure that is configured to maintain the first and second terminals in fixed relationship to one another during assembly of the actuator.

In a further embodiment of any of the above, the housing includes a main housing portion, a motor housing portion, and a cover. The motor is arranged in the motor housing portion.

In a further embodiment of any of the above, the main housing portion includes a bore, and includes a support plate that is arranged in the bore and internally separates the housing to provide a motor cavity within which the motor is arranged.

In a further embodiment of any of the above, the actuator includes a gear train that is operatively couples the motor to the output shaft. The gear train is arranged within the housing on a side of the support plate that is opposite the motor.

In a further embodiment of any of the above, the support plate includes a pilot that aligns the motor housing portion relative to the main housing portion.

In a further embodiment of any of the above, the first PCB is mounted to the support plate and is arranged within the motor cavity.

In a further embodiment of any of the above, the motor circuit includes a Hall sensor that is configured to sense an angular position of the output shaft via a position of the motor.

In a further embodiment of any of the above, the actuator includes a connector that is mounted on the support plate on a side opposite the motor cavity. The second PCB operatively electrically connects to the first PCB via the connector.

In a further embodiment of any of the above, the first terminals are electrically connected directly to the connector, and the second terminals are electrically connected directly to the second PCB.

In a further embodiment of any of the above, the second PCB is arranged in a PCB cavity that is provided in the main housing portion that is separated from the motor, and the cover is secured to the main housing portion over the second PCB.

In a further embodiment of any of the above, the main housing portion includes a boss, and the adapter includes a mounting ear that is secured to the boss with a fastener.

In a further embodiment of any of the above, the second terminals are male terminals, and the second PCB includes female terminals that interconnect with the male terminals.

In a further embodiment of any of the above, the female terminals are provided by open windows that provide visibility to the male terminals during assembly of the actuator.

In a further embodiment of any of the above, the actuator includes a connector that is electrically connected to the first PCB, and the first terminals are electrically connected to the connector.

In a further embodiment of any of the above, the first terminals are male terminals.

In a further embodiment of any of the above, the first and second terminals are male terminals.

In another exemplary embodiment, a method of assembling an actuator includes placing a first PCB in a housing, installing a motor in the housing, inserting a rigid electrical adapter into the housing to operatively electrically connect the rigid electrical adapter to the first PCB, engaging a second PCB with the rigid electrical adapter to operatively electrically connect the first and second PCBs to one another, and securing a cover over the second PCB to enclose the housing.

In a further embodiment of any of the above, the placing step includes exposing an electrical connector to the rigid electrical adapter. The electrical connector is operatively electrically connected to the first PCB In a further embodiment of any of the above, the placing and installing steps are performed separately.

In a further embodiment of any of the above, the engaging step includes visually aligning male terminals that are provided by the rigid electrical adapter through windows that are provided by female terminals on the second PCB to electrically connect the male and female terminals.

BRIEF DESCRIPTION OF THE DRAWINGS

The disclosure can be further understood by reference to the following detailed description when considered in connection with the accompanying drawings wherein:

FIG. 2 is a cross-sectional view through the actuator of FIG. 1B taken along line 2-2.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
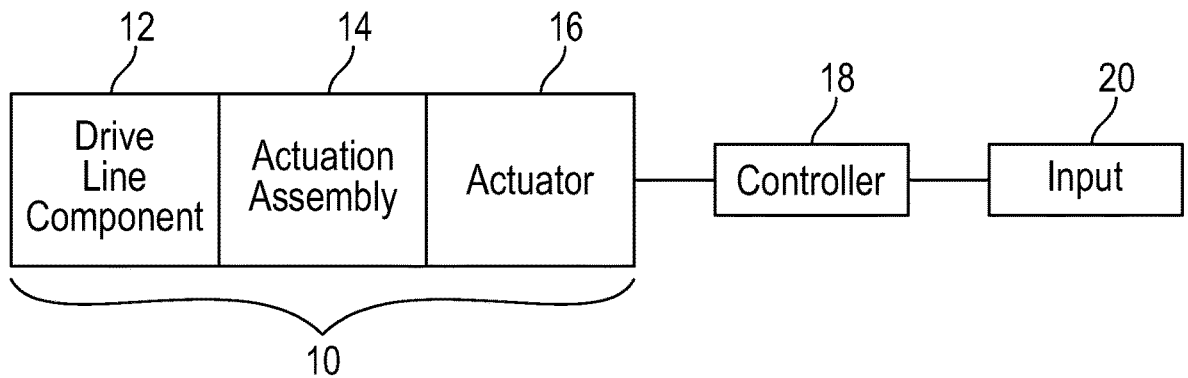
FIG. 1A is a highly schematic view of a drive train and its control system.

FIG. 1A illustrates a drive train 10 having a driveline component 12 such as a transmission or differential. The driveline component imparts drive from the vehicle's propulsion system to the wheels. One type of drive train 10 includes an actuation assembly 14 that moves between locked and unlocked positions to permit rotation of the driveline component during vehicle operation and lock out any rotation when the vehicle is parked to prevent the vehicle from rolling. The actuation assembly 14 is operated by an actuator 16 (e.g., via output gear 30; see, FIG. 1B) that receives an electrical signal from a controller 18 and/or an input 20 such as a switch. Although the disclosed actuator is described as being used in a 2-position park-lock system, it should be understood that the actuator may have other applications and operate in more than two positions for those applications.

Figure 1B:
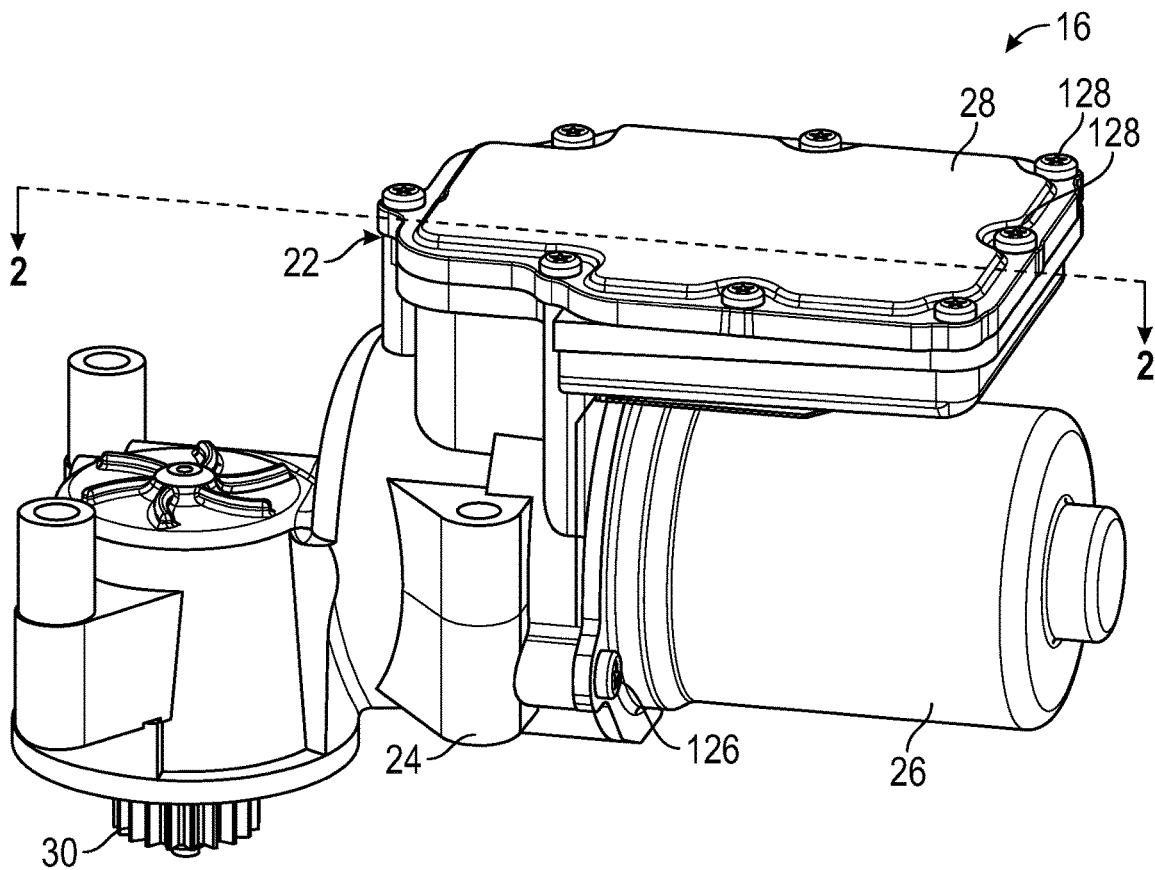
FIG. 1B is a perspective view of one example actuator.

FIG. 1B illustrates one example actuator 16 according to the disclosure. The actuator 16 includes a housing 22, commonly plastic, that is typically constructed from multiple housing components for ease of manufacturing and assembly. In the example, the housing 22 includes a main housing portion 24 to which a motor housing portion 26 and cover 28 are secured. Fasteners 126 and 128 are used to respectively secure the motor housing portion 26 and cover 28 to the main housing portion 24. Referring to FIG. 2, the actuator is shown in more detail.

An electric motor 32 is arranged within the motor housing portion 26 which provides at least a portion of a motor cavity 33. The motor 32 rotationally drives an output shaft 42 to which the output gear 30 is mounted (not shown in FIG. 2). In the example, a shaft 36 of the motor 32 rotates a worm 38 via a gear train 34, which reduces the rotational speed and increases output torque of the motor 32. The worm 38 is coupled to a worm gear 40 on the output shaft 42. Other gear arrangements may be used if desired. A cap seal 44 is mounted to the main housing portion 24 to seal the output shaft 42 relative to the housing 22.

A support plate 46 is received in a bore 50 and sealed relative to the main housing portion 24 by seals 48. The support plate 46 includes a pilot 52 that extends in an X-direction to radially locate the motor housing portion 26 in an X-Y plane with respect to the main housing portion 24. A first printed circuit board (PCB) 54 is mounted to the support plate 46 and is arranged within the motor cavity 33. The support plate 46 and its seals 48 isolate the motor cavity 33 and the first PCB 54 from any lubricating grease and debris associated with the gear train 34.

The first PCB 54 includes a motor circuit 56 associated with the monitoring and control of the motor 32, for example. In one example, the motor circuit 56 includes a Hall sensor, which may be used to detect the rotational position of the motor 32 as compared to a commanded position. A connector 58 is electrically connected to the first PCB and is configured to provide terminals for connection to a second PCB 64 arranged within a PCB cavity 60 of the main housing portion 24. In one example, the second PCB 64 has additional processing capability for enhanced control diagnostics and monitoring of the actuator 16 and communication with external controllers, such as a PCM.

Figure 3:
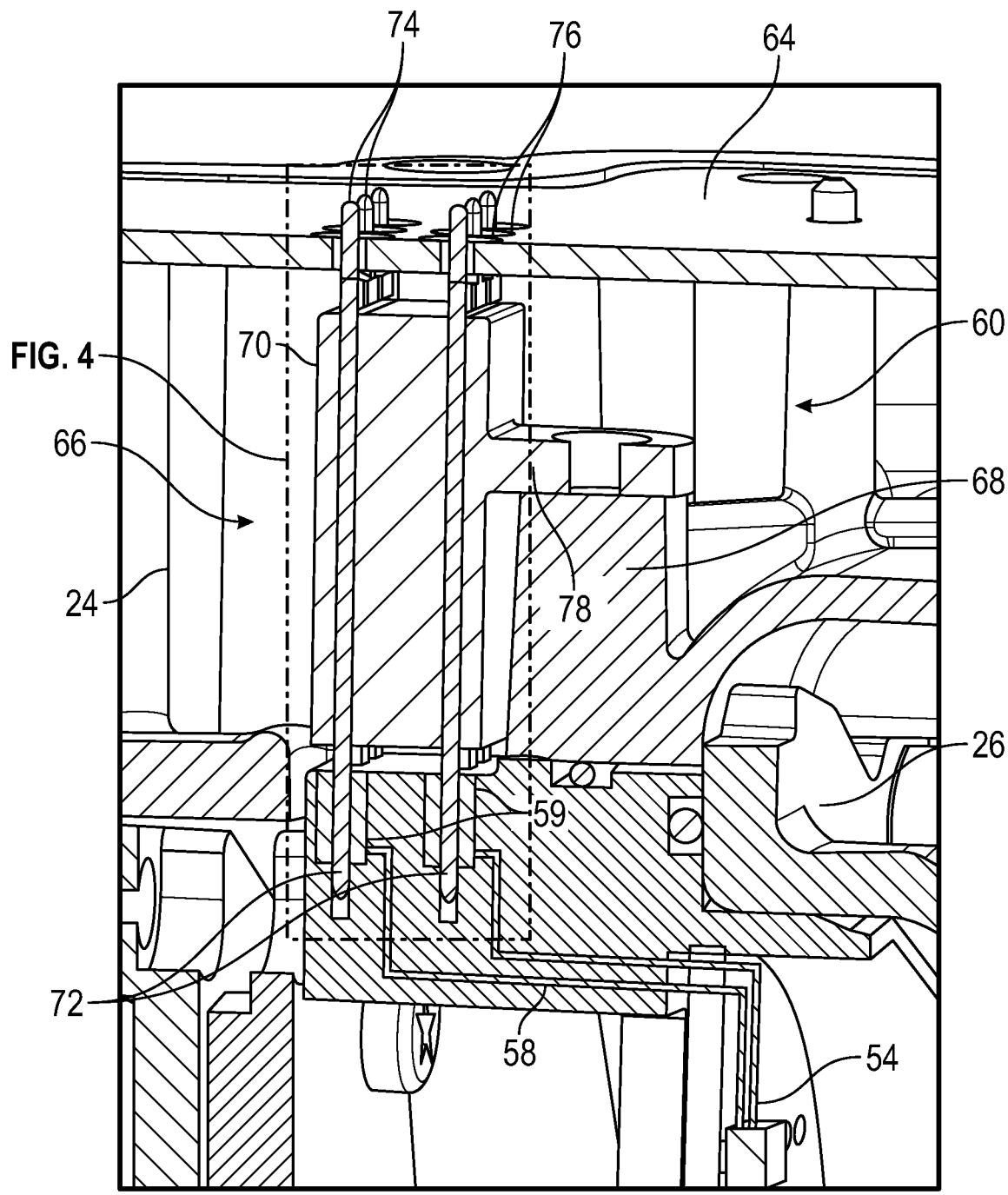
FIG. 3 is an enlarged cross-sectional view of an adapter used to connect multiple PCBs within the actuator.

The connector 58 enables electrical connections to be passed from the side of the support plate 46 having a first PCB 54 to the opposing side of the support plate 46 and orient the terminals of the connector 58 in a desired orientation during assembly. When installed, the connector 58 is aligned with an opening in the main housing portion 24 to the PCB cavity 60 such that lubricating grease and debris associated with the gear train 34 is not able to easily pass into the PCB cavity 60. In one example, the connector 58 provides female connectors 59 (FIG. 3). With the sealed connector 58 and the seals 62 provided between the cover 28 and the main housing portion 24, the PCB cavity 60 is well-isolated from any water, debris and/or grease.

Assembly of the printed circuit boards into the housing 22 is performed by hand and can be difficult due to the limited access and tight spaces. A gap 66 separating the connector 58 and the second PCB 64 requires an electrical connection to provide communication between the PCBs. This type of connection might typically be accomplished with a flexible ribbon connector, which requires good dexterity and is quite difficult to perform. The disclosed adapter 70 makes the electrical connections between the first and second PCBs 54, 64 much easier for the assembler and much more reliable.

Figure 4:
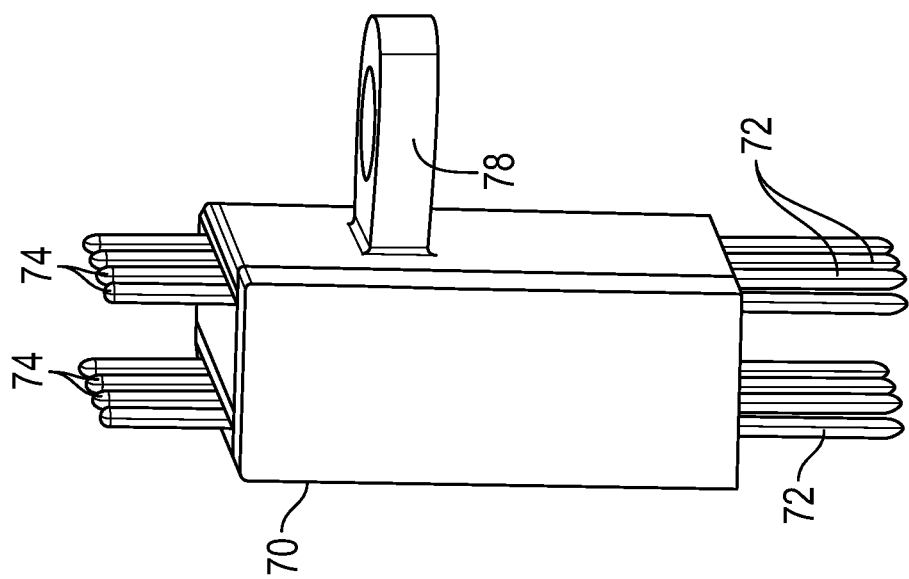
FIG. 4 is a perspective view of the adapter.

The adapter 70, also shown in FIGS. 3 and 4, includes first and second ends opposite one another and respectively including first and second terminals 72, 74 (extending in the Y-direction). To simplify handling, the electrical elements electrically connecting the first and second terminals are arranged in a rigid enclosure that provides an inflexible body configured to maintain the first and second terminals 72, 74 in fixed relationship to one another during assembly of the actuator 16. In one example, electrical elements are encased in a plastic, such as by overmolding.

In the example, both the first and second terminals 72, 74 are male terminals, which makes assembly easier and also is more cost effective if the terminals become damaged during assembly. That is, the more inexpensive adapter 70 may be replaced if damaged during assembly rather than the much more expensive connector 58 and/or second PCB 64.

Figure 5:
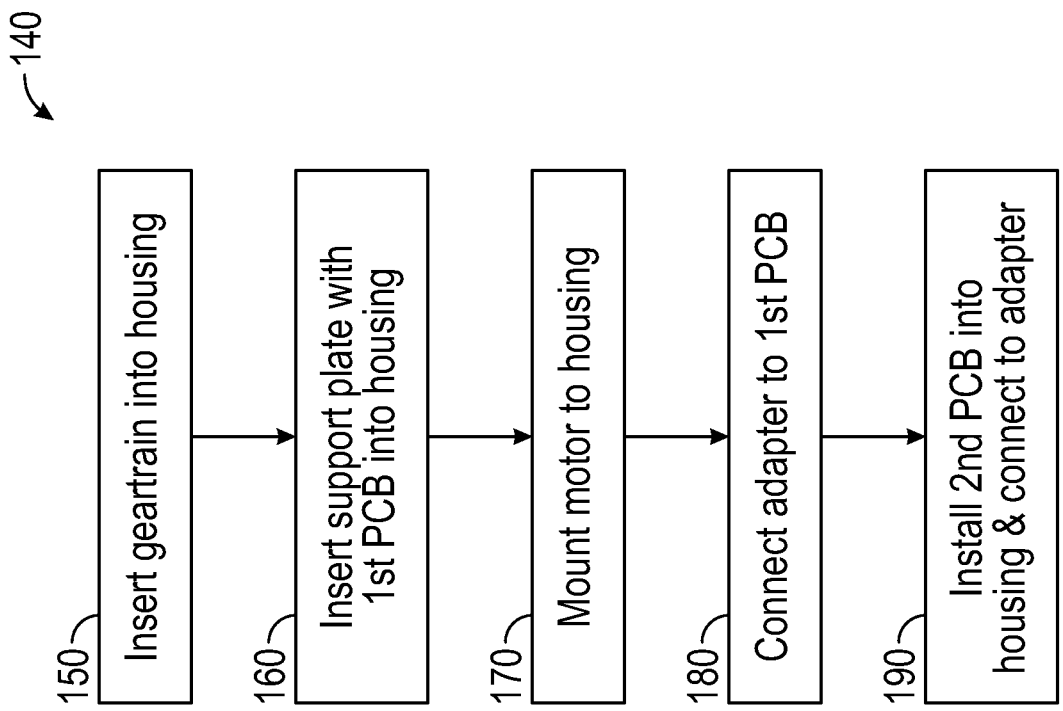
FIG. 5 is a flowchart illustrating an example method of assembling the actuator.

During an assembly method 140, shown in FIG. 5, if used the gear train 34 is inserted into the housing 22 (block 150). The support plate 46 is inserted into the bore 50 of the main housing portion 24. In one example, the first PCB 54 is mounted to the support plate 46 prior to insertion into the housing 22 (block 160). The motor 32 may be mounted to the support plate 46 and located relative thereon by the pilot 52. The motor housing portion 26 is secured to the main housing portion 24 with the fasteners 126 (block 170).

With the support plate 46 and its mounted connector 58 arranged in the main housing portion 24, the end of the connector 58 is aligned with and exposed to the PCB cavity 60. The female connector terminals 59 are accessible as the cover 28 has yet to be installed. The first terminals 72 of the adapter 70 are inserted into the connector terminals 59 until the mounting ear 78 is seated against the boss 68, operatively electrically connecting the adapter 70 to the first PCB 54 (block 180). A fastener 79 secures the adapter 70 to the main housing portion 24 once fully seated.

In the example, the second PCB 64 has female terminals 76 which act as windows during assembly providing visibility to the assembler of the second male terminals 74. That is, as the second PCB 64 is lowered onto the adapter 70, the second terminals 74 are aligned with and engage the female terminals 76 (block 190) ensuring that the terminals are not damaged when the second PCB 64 is fully seated. Once the second PCB 64 is secured to the main housing portion 24 by fasteners 65, the cover 28 is arranged over the PCB cavity 60 and secured by fasteners 128.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An actuator comprising:
    a housing including a main housing portion and a motor housing portion;
    a motor mounted to the housing and operatively coupled to an output shaft, wherein the motor is arranged in the motor housing portion;
    a first PCB arranged in the housing near the motor and including a motor circuit;
    a second PCB arranged in the housing and spaced at a gap from the first PCB;
    an electrical adapter arranged in the gap and operatively electrically connecting the first and second PCBs, the adapter including first and second ends opposite one another, and electrical elements extending between the first and second ends to first and second terminals respectively provided at the first and second ends, the electrical elements arranged in a rigid enclosure configured to maintain the first and second terminals in fixed relationship to one another during assembly of the actuator; and
    a support plate internally separating the main housing portion from the motor housing portion to provide a motor cavity within which the motor is arranged, wherein the first PCB is mounted to the support plate and is arranged within the motor cavity.

2. The actuator of claim 1, wherein the housing includes a cover.

3. The actuator of claim 2, wherein the main housing portion includes a bore, and the support plate is arranged in the bore.

4. The actuator of claim 3, comprising a gear train operatively coupling the motor to the output shaft, the gear train arranged within the housing on a side of the support plate that is opposite the motor.

5. The actuator of claim 3, wherein the support plate includes a pilot aligning the motor housing portion relative to the main housing portion.

6. The actuator of claim 2, wherein the second PCB is arranged in a PCB cavity provided in the main housing portion that is separated from the motor, and the cover is secured to the main housing portion over the second PCB.

7. The actuator of claim 6, wherein the main housing portion includes a boss, and the adapter includes a mounting ear secured to the boss with a fastener.

8. The actuator of claim 1, wherein the motor circuit includes a Hall sensor configured to sense an angular position of the output shaft via a position of the motor.

9. The actuator of claim 1, comprising a connector mounted on the support plate on a side opposite the motor cavity, the second PCB operatively electrically connected to the first PCB via the connector.

10. The actuator of claim 9, wherein the first terminals are electrically connected directly to the connector, and the second terminals are electrically connected directly to the second PCB.

11. The actuator of claim 1, wherein the second terminals are male terminals, and the second PCB includes female terminals that interconnect with the male terminals.

12. The actuator of claim 11, wherein the female terminals are provided by open windows providing visibility to the male terminals during assembly of the actuator.

13. The actuator of claim 1, comprising a connector electrically connected to the first PCB, and the first terminals are electrically connected to the connector.

14. The actuator of claim 13, wherein the first terminals are male terminals.

15. The actuator of claim 1, wherein the first and second terminals are male terminals.

16. A method of assembling an actuator comprising:
    placing a first PCB in a housing;
    installing a motor in a motor cavity of the housing;
    coupling a gear train to the motor;
    placing a support plate against the first PCB between the motor cavity and the gear train;
    inserting a rigid electrical adapter into the housing to operatively electrically connect the rigid electrical adapter to the first PCB;
    engaging a second PCB with the rigid electrical adapter to operatively electrically connect the first and second PCBs to one another; and
    securing a cover over the second PCB to contain the first PCB, the second PCB and the rigid electrical adapter within the housing.

17. The method of claim 16, wherein the placing a first PCB step includes exposing an electrical connector to the rigid electrical adapter, the electrical connector is operatively electrically connected to the first PCB.

18. The method of claim 17, wherein the placing a first PCB and installing steps are performed separately.

19. The method of claim 16, wherein the engaging step includes visually aligning male terminals provided by the rigid electrical adapter through windows provided by female terminals on the second PCB to electrically connect the male and female terminals.

20. The method of claim 16, comprising:
    mounting the first PCB to the support plate; and
    mounting the motor to the support plate.

* * * * *